United States Patent [19]

Curtin et al.

[11] 4,401,856

[45] Aug. 30, 1983

[54] CONTROL SYSTEM FOR HANDLING DIRECT INWARD DIALED TELEPHONE CALLS

[75] Inventors: William J. Curtin; Paul N. Henning; Kendall E. Post, all of Madison, Wis.

[73] Assignee: Amtel Communications, Inc., Madison, Wis.

[21] Appl. No.: 263,284

[22] Filed: May 13, 1981

[51] Int. Cl.³ .................... H04M 3/50; H04M 3/54
[52] U.S. Cl. ......................... 179/27 FH; 179/18 BE
[58] Field of Search ......... 179/27 FH, 27 FG, 27 FF, 179/27 FC, 27 CA, 18 HA, 18 AD, 18 BE, 18 FH

[56] References Cited

U.S. PATENT DOCUMENTS 4,256,928  3/1981  Lesea et al. ................ 179/18 BE

OTHER PUBLICATIONS

"New PABXs for the International Market: Siemens Telephone System 400E, Capacity Stages 20/150 and 60/600", by Peter Binder, *Siemens Review*, XLV, (1978), No. 1, pp. 30–36.

"ROLM Centralized Attendant Service", ROLM Corporation Brochure, 1979.

"Telephone Answering Service Does More Than Answer Phones", by Nai Nai Price, *Telephony*, Sep. 11, 1981, pp. 70–72.

*Primary Examiner*—Thomas W. Brown
*Attorney, Agent, or Firm*—LeBlanc, Nolan, Shur & Nies

[57] ABSTRACT

A control system for enabling direct inward dialed telephone calls received on a single access line from a telephone central office to be answered with identity. The single access line is coupled at the telephone central office to a block of telephone numbers, and incoming calls to any of these numbers are connected to the access line and to an operator at a telephone answering location through the control system, and the number called is decoded by the control system. A DID line ("DID" stands for direct inward dial) on the interface is arranged in the input section of the control system and is coupled to the single access line that receives the telephone calls from the telephone central office. At least the last digit of the telephone number is decoded within the control system and a visual display of the decoded number is then provided for identifying the incoming call. The control system includes an operator interface for enabling an operator at the site of the telephone answering system to be plugged into the control system for being coupled to the incoming calls being transferred along the single access line. A microprocessor controls the operation of the control system.

17 Claims, 5 Drawing Figures

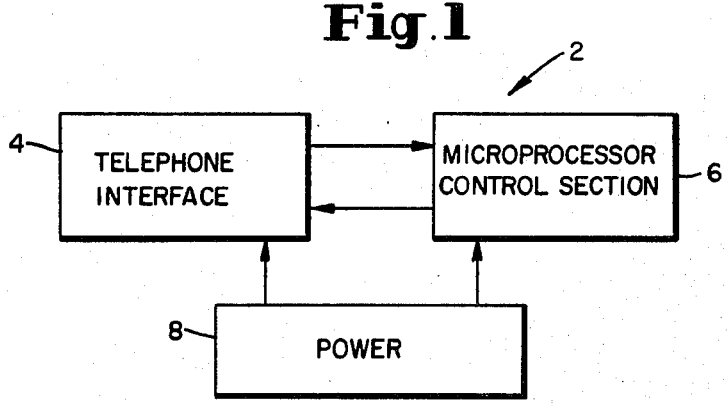
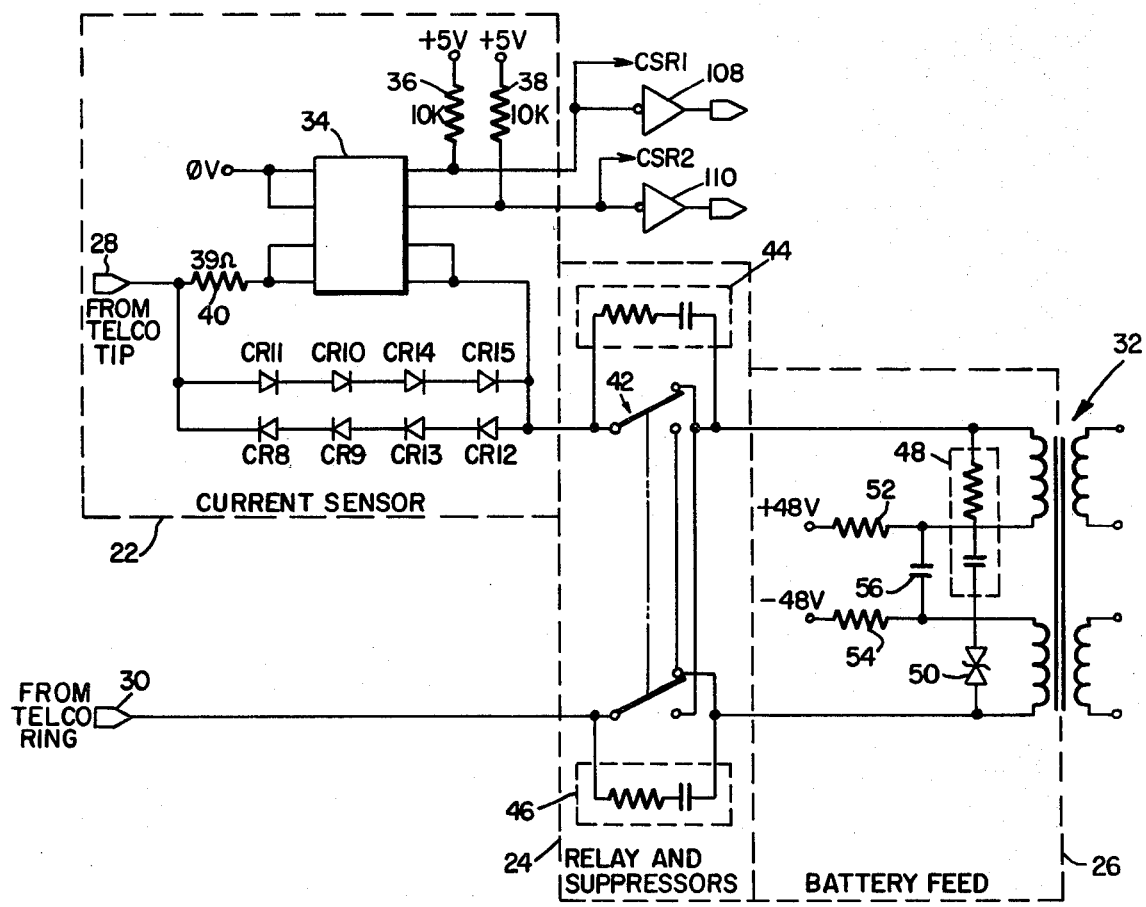

CONTROL SYSTEM FOR HANDLING DIRECT INWARD DIALED TELEPHONE CALLS

BACKGROUND OF THE INVENTION

The present invention involves a control system for handling incoming direct inward dialed telephone calls (hereafter referred to as "DID").

Direct inward dialing was brought about to allow a caller to bypass the bottleneck of the switchboard and call directly to a person's desk or to an area of interest in a company office or plant.

These numbers were very inexpensive compared to the ordinary number that was rented from the telephone company, and it was common to order 100 numbers at a time. But even though 100 numbers were ordered, usually just a few pairs of wires (access lines) came in from the phone company to serve the 100 numbers.

Call forwarding came into vogue and allowed a person's telephone to be call forwarded to another number. The answering service providing such service, having several clients, didn't know whose number was being forwarded until the telephone company allowed another usage for DID numbers.

Now answering services assign individual DID numbers to each client who call forwards his line to the answering service. So the answering service has the identity of whose line is being called and may answer in the client's name. With such a system, a block of telephone numbers, e.g. 100 numbers, are assigned to a particular answering service and each block of telephone numbers is coupled to the answering service through access lines. These access lines, for example, can be coupled into the telephone system at the telephone central office at a location of the third from the last digit of the switching mechanism. For example, if a telephone number being called is 765-4321 then at the location of the output of the switch for the fourth digit (4) and before the switch for the fifth digit (3), an access line is coupled to the output of the fourth digit switch and all of the incoming calls bearing numbers 765-4--- are then sent along one of the access lines to the telephone answering system.

Over the past several years, complex multiterminal call forwarding devices have been developed. These devices serve to couple a telephone answering system to a plurality of access lines assigned to blocks of DID numbers of a telephone central office. Each system which is coupled to a plurality of access lines is controlled by one central computer control section. Such equipment has been developed as the primary member of a telephone answering system adapted to essentially stand alone without being used in conjunction with any other type of equipment except the individual telephones of the operators.

The telephone answering systems that have been developed have a plurality of incoming access lines coupling the system to several blocks of DID numbers. Such DID numbers typically have been used in conjunction with call forwarding devices. A particular subscriber with an individual telephone number sets up the subscriber's phone for call forwarding, and when the call comes to the subscriber it is then transferred to a number provided the subscriber by the telephone answering service. The call forwarding number provided to the subscriber is one of the numbers in the block of DID numbers that are rented by the telephone answering service. Each subscriber can be provided with a separate DID number of the block of numbers so that identification of the particular incoming DID number will fully identify the subscriber receiving the call.

While such systems have been extensively developed, the systems have been designed to be operated as totally independent members separate from any telephone switchboard. In addition, the systems have been designed to typically handle four or more access lines, and normally 5 to 10 access lines, coupling the system to the telephone central office. While there are four different access lines used in conjunction with the system, only a single computer has been used for controlling all of the handling of the incoming calls and distribution of the calls to various operators at the telephone answering service. With such an operation, if the computer of the system breaks down or malfunctions, then the entire system is down and the telephone answering service is completely out of commission.

SUMMARY OF THE INVENTION

An object of the present invention is to provide a control system for handling call forwarding of DID numbers in conjunction with an existing telephone answering switchboard.

Another object of the present invention is to provide a control system for handling incoming DID telephone calls along a single access line from a telephone central office with the control system having its own microprocessor control section and only handling calls from a single access line.

A further object of the present invention is to provide a control system that can be incorporated into an existing telephone answering switchboard for significantly increasing the telephone answering capacity of such a switchboard.

A still further object of the present invention is to provide a control system capable of being utilized in conjunction with a telephone coupled to a single access line for receiving telephone calls from a block of DID numbers so that the person answering the telephone can identify the incoming caller. Thus, instead of using the control system for forwarded calls, the control system is being used to identify unpublished DID numbers given to selected people or companies.

This invention is unique from other devices which are used in call forwarding and DID applications in that:

1. It is the only device which is designed to interface with a single DID access line and utilize small blocks of DID numbers, thus providing an economical way for telephone answering service (TAS) bureaus, small businesses, or even residential users to employ DID service beneficially.

2. It is the only device which is designed to work in conjunction with a TAS switchboard allowing a bureau to expand the number of customers served by a single switchboard and operator. The operator utilizes existing switchboard plugs to answer calls on a control system mounted in or on a switchboard and does not need to learn new operating procedures.

3. When multiple units are employed in conjunction with a series of rotary hunt access lines, redundance is generally obtained. If one of the devices fails, that line is disabled by the telephone company and all calls are funneled down the remaining lines to the unit or units which remain functional.

The primary utilization of the control system of the present invention is for use as a call forwarding terminal that does not stand alone but is employed for retrofitting an existing telephone answering switchboard. The control system is adapted to be either mounted on or inserted into the switchboard and to be answered by a telephone line from the switchboard, i.e. a switchboard cord, by the operator of the switchboard.

Several references are made herein to the utilization of the control system of the present invention in conjunction with retrofitting an existing telephone answering switchboard. While the present invention can be used with any type of existing telephone answering switchboard, two examples of such switchboards are the Model Nos. 557A and 557B that have been manufactured by Western Electric Corp.

In utilizing the control system, a telephone answering service subscriber would call forward his telephone to a particular telephone number with the use of a block of direct inward dialed telephone number (the DID numbers). These DID numbers are rented from the telephone company in groups of 10, 20, 50 or 100 numbers at a time. Each subscriber is provided with a different telephone number to which to forward the subscriber's calls. By identifying the DID number being called, which is one of the DID numbers, by an incoming call such identification also identifies the particular subscriber receiving the call since each subscriber can be assigned a different DID number.

A second potential utilization of the control system in answering incoming calls associated with DID numbers is to give different particular numbers to different subscribers so that these individual numbers can be advertised in a telephone directory. For example, in a subscriber's Yellow Page advertisement, it could state "If no answer, please call 000-0000". Such an operation provides "If no answer" service with identity of the particular subscriber being called. Consequently the operator at the telephone answering service knows which subscriber is being called by the incoming call to the telephone answering service.

Another possible use of the control system for handling DID lines of the present invention is to assist individuals in identifying incoming callers. Individuals can rent a block of DID numbers from the telephone company (for example, 10 numbers but still only one access line) and then use the control system so as to enable the individual user to be able to identify the incoming caller. For example, people in business have special groups of clients to whom they desire to provide special attention. By giving any particular client a particular DID number which is unpublished, when the control system identifies the particular DID number being called, the telephone user then knows which client is calling and the individual user can act accordingly. While in accordance with the preferred embodiment of the present invention, as disclosed herein, it is indicated that the last three digits of the called DID number is displayed, it is possible that the control system could display a different number of digits or the actual name of the particular client or subscriber associated with the particular DID number.

In order to achieve all of the above objectives, the control system of the present invention is coupled to a single access line from a telephone central office. If a telephone answering services desires to have more than one access line coming from the telephone central office to the answering service then a separate control system, each having its own microprocessor control, is used for each access line. With the assistance of equipment in the telephone central office, it is possible for each of the many access lines to be able to receive any call into the same block of DID numbers. In such a situation, the telephone central office has equipment which will connect an incoming call to one of the DID numbers to any available access line extending from the telephone central office to the telephone answering service. In this manner, if any one or more of the lines is either occupied with another call or is down due to a malfunctioning of either the control system or its microprocessor then the other available lines are still in functioning order and capable of receiving the incoming calls. The utilization of a separate control system for each access line provides a significant advantage over the prior systems in which a plurality of access lines were associated with a single control system. In the prior systems if the control system or its microprocessor was down for any reason then the entire system was down. With the utilization of the present invention, however, a malfunction of any one control system has no effect on the operation of the other control systems and hence the telephone answering service is still able to carry on its operations. In essence each control system provides a 100% back-up for each other control system being utilized in this manner.

The control system of the present invention enables the incoming DID telephone calls to be answered and identified. The control system includes a DID/telephone company interface that couples the control system to the single access line for receiving the DID telephone calls from the telephone central office. An operator interface enables the operator at the telephone answering service to be coupled into the control system for answering incoming calls from the single access line. The incoming DID calls are not fully decoded by the telephone company but the final decoding of the number is carried out within the control system with at least the last digit of the telephone number being decoded. The control system is set up so as to be able to handle the decoding of the last three digits of any incoming call although a different number of digits to be decoded can be utilized. The control system includes visual display members for displaying the particular numbers that are decoded within the control system and display drivers for controlling the operation of the display members. A single microprocessor which is associated with only the single access line coupled to the control system serves to control the operation of the control system.

When a call is placed or forwarded to the allocated block of DID telephone numbers, the telephone central office seizes a trunk, or access, line to the terminal equipment. This seizure remains in effect for the duration of the call. After seizure of the access line, the dialing from the telephone central office to the terminal equipment where the control system is located will be on an immediate start, delay dial or wink start basis (all three of which are different types of common initiating mechanisms utilized by the telephone company) depending on the type of equipment at the telephone central office. With the operation of all three types of operations, the telephone central office seizes the access line for at least 70 ms so as to provide a signal that it is ready to pulse the digits to the control system over the access line.

If the telephone central office is a step-by-step type then the in-dialed digits will generally be sent in the same format as used to control the final stages of switching in the telephone central office. Consequently the terminal equipment must be ready to receive digits immediately (70 ms) after seizure of the access line.

For a wink start operation, the terminal equipment must provide a 200 ms nominal battery reversal when the equipment is ready to receive dial pulses. This is the wink start signal. After sending the wink, the terminal equipment may see a reflection of the off-hook to on-hook transition (the trailing edge of the battery reversal). Since this will appear to be the digit 1, the terminal equipment must ignore it, i.e. must generally ignore in-pulses on the access line for 70 ms after transmission of the wink. The terminal equipment should not return an answer signal (battery reversal) during the pulsing operation. After the dial pulses have been received by the terminal equipment, the terminal equipment transmits a call progress tone to the calling station. The call progress tone for this equipment is an audible ringing sound (referred to herein as "ring-back").

When the terminal equipment answers, i.e. when the telephone answering service (referred to herein as "TAS") operator goes off hook, the terminal equipment must provide continuous battery reversal during the off-hook interval. This is interpreted by the telephone central office as an answer signal.

The telephone central office transmits across the access line an idle state signal when it believes the line is idle. This idle state signal is a current interruption of at least 140 ms. The terminal equipment must ignore shorter line breaks which may result from transients. In many offices, the current interruption is continued until the beginning of the next dial signal, i.e. the idle line has no current.

If the telephone central office disconnects first, it will interrupt the current for at least 140 ms, the duration of the idle signal. The terminal equipment must respond by returning the battery polarity to its normal idle condition so as to be ready for receiving another call within 400 ms. If the terminal equipment disconnects first, then it returns battery polarity to the normal idle condition and waits for the idle signal from the central office. This may take up to 32 seconds for such a response in the operation of some telephone central offices. During this time interval, the terminal equipment will not be ready for another call.

On conventional private telephone circuits, the user dials into one or more of the telephone central offices and the last central office connects the caller to the circuit for the telephone being called. The central office equipment interprets the pulses and these pulses do not go to the other telephone. With direct inward dialing, the dial pulses are sent directly to the terminal equipment which may serve a multitude of telephone numbers. The references herein to the "terminal equipment" refers to the control system of the present invention.

The dial-pulse signalling must be compatible with one of the three types of trunk circuits having delay dial, wink start or immediate start. The delay dial supervision takes advantage of economies obtained by using slower communication links at the called end and by engineering these links for delay before pulsing occurs. Since the delays may vary, the terminal equipment must provide a signal to show that it is ready, or not ready, to receive pulses. Before the central office pulses digits, it interrupts the current on the access line. After 100 ms but within 4 seconds, the terminal equipment must reverse the loop current towards the central office for 140–400 ms. This signal informs the telephone central office that the terminal equipment has seized the access line. The terminal equipment must be ready to receive pulses within 70 ms of the trailing edge of this signal in order to prevent registration of false line reflection pulses initiated by line seizures. The central office then proceeds to pulse the digits at 8–12 Hz.

Wink start supervision is the same as delay dial supervision except that the timing is more stringent. The terminal equipment must reverse the current flow to the telephone central office within 100–300 ms after commencement of the dial signal. In connection with the immediate start supervision, the telephone central office sends the start dial signal and then proceeds to pulse the digits. The terminal equipment does not receive the reverse current flow as in the delay dial or wink start supervision and hence must be ready to receive pulses within 70 ms after the start signal.

In general the telephone central offices utilize either loop dial pulsing or battery ground pulsing depending on the capability of the telephone central office and the characteristics of the loop. Some telephone central offices add a battery in series to the access line during the dial pulsing. This is normally referred to as battery-ground or series aiding and is designed primarily for use on long lines where the supplied DC current may be too low for reliable signalling. The terminal equipment of the present invention would normally be utilized relatively close to a telephone central office so that low current will not create a problem.

The terminal equipment receives and correctly registers dial pulses from the telephone central office at a rate of between 8–12 pulses per second and 42–84% break.

The terminal equipment must provide an off-hook condition immediately after it goes off-hook and maintain this condition until it is disconnected.

In order to disconnect the access line, the terminal equipment must restore on-hook polarity towards the telephone central office and then must wait for the central office to go on-hook. When an on-hook signalling from the telephone central office persists for more than 300 ms the terminal equipment returns to the idle state and must be prepared to process a new call within 70 ms of the start of the central office on-hook signalling.

Address signalling pulses consist of a sequence of momentary openings of the loop. The numerical value of each dialed digit is represented by the number of on-hook intervals and a train of pulses except for "0" which is ten pulses. The on-hook intervals are separated by short off-hook intervals. The individual complete digits are separated by relatively long off-hook intervals.

Call progress tones are sent from the terminal equipment. Such tones must have tone quality and a rate of interruption which are easily recognized and understood by the users of the telephone network.

The various components of the control system are selected so as to maximize the audio path transparency. The transformer of the control system coupling the interfaces between the telephone company and the operator is allowed a maximum loss of 1 db. The impedances of the control system are a function of the operator station equipment and of the impedance to the line to the telephone central office. The normal voice frequency band width of the equipment extends from approximately 300 Hz to 3000 Hz.

BRIEF DESCRIPTION OF THE DRAWINGS

FIG. 1 is a block diagram of the principle component sections of the control system of the present invention.

FIG. 3 is a circuit diagram of the DID-Telco (i.e. telephone company) interface.

DESCRIPTION OF THE PREFERRED EMBODIMENT

There are three primary components of the control system 2 of the present invention. These components, which are illustrated in block diagram form in FIG. 1, are telephone interface 4, microprocessor control section 6 and power supply section 8. The telephone interface includes both an interface coupling the system with the access line from the telephone central office (often referred to as "Telco") and the operator interface to which the operator at the telephone answering service (referred to herein as "TAS") can connect a line so as to be coupled to incoming calls on the access line through the control system. The telephone interface also includes the ring-back tone injection interface. Microprocessor control section 6 includes the microprocessor control and the display driver section, which drives the visual display for displaying the decoded numers.

Figure 2:
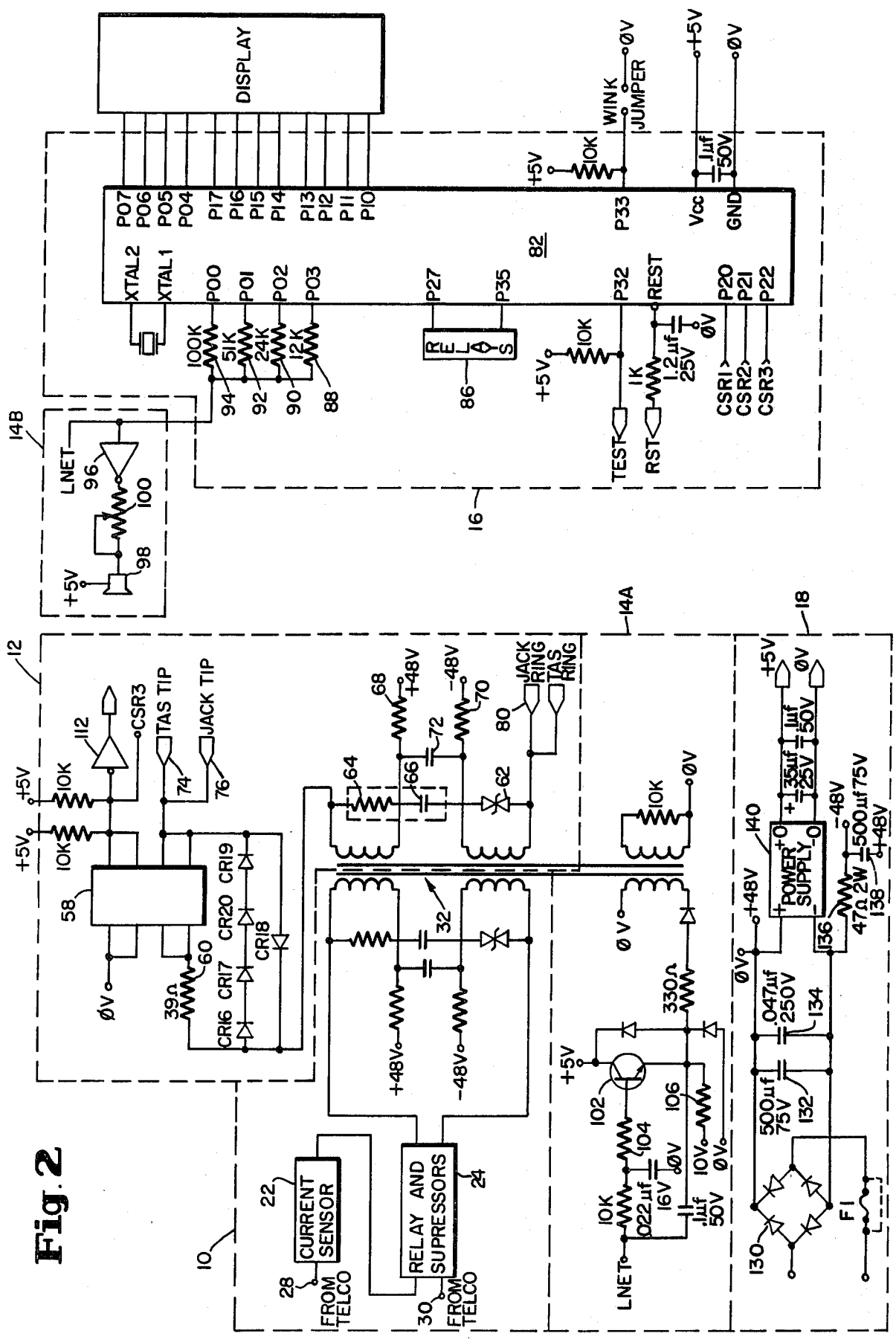
FIG. 2 is a block diagram of the control system of the present invention with some of the circuitry being illustrated.

Telephone interface 4 includes DID-Telco interface 10, operator interface 12 and ring-back tone injection interface 14a and 14b, all of which are shown in FIG. 2. The DID/Telco interface includes a current sensor 22, a line reversal relay and transient suppressors 24 and a battery feed structure 26, which includes the primary windings of a transformer 32.

Current sensor 22 (as shown in FIG. 3) is formed by an integrated circuit optoelectronic coupler 34, a plurality of diodes CR8–CR15, two 10k ohms pull-up resistors 36 and 38, and a 39 ohm current limiting resistor 40. The photoemitter or photodiodes of coupler 34 are arranged so as to be in parallel in opposite directions for providing bi-directional current sensing. Since the photoemitters may not be able to handle the 80 mA maximum loop current which may appear on the Telco access line coupled to the current sensor at point 28, the circuit is designed for limiting the incoming current. Resistor 40 and diodes CR8–CR15 are provided for this current limiting purpose so as to act as a safety valve for currents which exceed the 60 mA capacity of optoelectronic coupler 34. The output of each half of coupler 34 is separately fed to the microprocessor in control section 6 through output lines CSR1 and CSR2. By providing such signals to the microprocessor, it is possible for the microprocessor to monitor 3 conditions: (1) the absence of current (an idle condition), (2) clockwise current flow, which occurs upon Telco seizure of the line and outpulsing operations, and (3) counterclockwise current flow, which occurs during a wink condition and during normal conversation.

Relay 42 provides for battery reversal which is needed in order to complete the DID coupling between the control system and Telco. For a delay dial and wink start initialization procedures, a momentary reversal of the incoming signals on the access line at 28 (from Telco tip) and the ring line at 30 (from Telco ring) is needed to commence outpulsing by Telco of the digits of the DID number being called that are to be decoded by the control system. For delay, wink and immediate start procedures, battery reversal is required when the operator connects to the access line from Telco. Such battery reversal signal is typically used for triggering coin phones, long distance toll collections and other forms of billing equipment.

Relay 42 is protected by transient suppressors 44 and 46. Each of the suppressors has in series a 100 ohm resistor and a 0.47 uf capacitor. Another identical suppressor, suppressor 48, is arranged in series with silicon three layer bi-lateral trigger 50, both of which are then arranged in parallel with the primary windings of transformer 32. The arrangement of suppressor 48 and trigger 50 in parallel with the primary windings of transformer 32 help to control inductive spikes which may be caused by battery current interruption, lightning and other similar types of occurrences.

The battery feed structure includes two resistors 52 and 54, each of which are 300 ohms-5 watt resistors, and a capacitor 56, which is a 1.8 uf-250 V metallized mylar capacitor. The resistors limit the current in the Telco loop to the maximum of 80 mA. The capacitor acts to prevent audio dissipation by the resistors and forces all audio energy to be coupled to the operator interface through transformer 32.

Operator interface 12, the circuitry of which is shown in FIG. 2, includes a current sensor, transient suppressors, a battery feed structure and the secondary of transformer 32. The current sensor of operator interface 12 is formed by an optoelectronic coupler 58, which can be the same type of coupler as coupler 34 of the DID/Telco interface, diodes CR16–CR20 and a current limiting resistor 60, which is a 39 ohm resistor. Both of the optoelectronic couplers 34 and 58 can be those marketed under the designation MCT6. Unlike the primary side of transformer 32 where the battery is reversed and the current changes direction, current flow through the loop in the operator interface is unidirectional. The same bi-directional optoelectronic coupler is used in both interfaces, however, merely for convenience. While it is unlikely that diode CR18 will ever be biased in an on condition during the lifetime of the control system, it is included as insurance against unforeseen fault conditions.

The transient suppressors include a three layer bi-lateral trigger 62 and a series connection of a 100 ohm resistor 64 and a 0.47 uf capacitor 66 all which are connected in parallel across the secondary windings of transformer 32. This transient suppressor suppresses inductive spikes that are caused by connection/disconnection of the operator headset and by other signals which may be induced into the secondary windings of transformer 32.

The battery feed structure of the operator interface includes two resistors 68 and 70 and an audio by-pass capacitor 72. Resistors 68 and 70 are each 470 ohm-5 watt resistors and capacitor 72 is a 5.8 uf capacitor. Resistors 68 and 70 act to limit the headset current to approximately 50 mA.

The output from coupler 58 is monitored by the control section by a coupling to the microprocessor through line CSR3. In addition, two resistors of 10k ohms each are coupled at the output of coupler 58 in the same manner as in the DID/Telco interface. Two coupling points 74 and 76 are provided in the operator interface. Coupling points 74 is for the TAS tip for enabling direct coupling to the TAS and coupling point 76 is a separate front panel jack tip that is provided for enabling a separate coupling to the control system. Similarly, coupling points 78 and 80 enable coupling of the TAS ring circuit and a separate front panel jack ring coupling.

Figure 4:
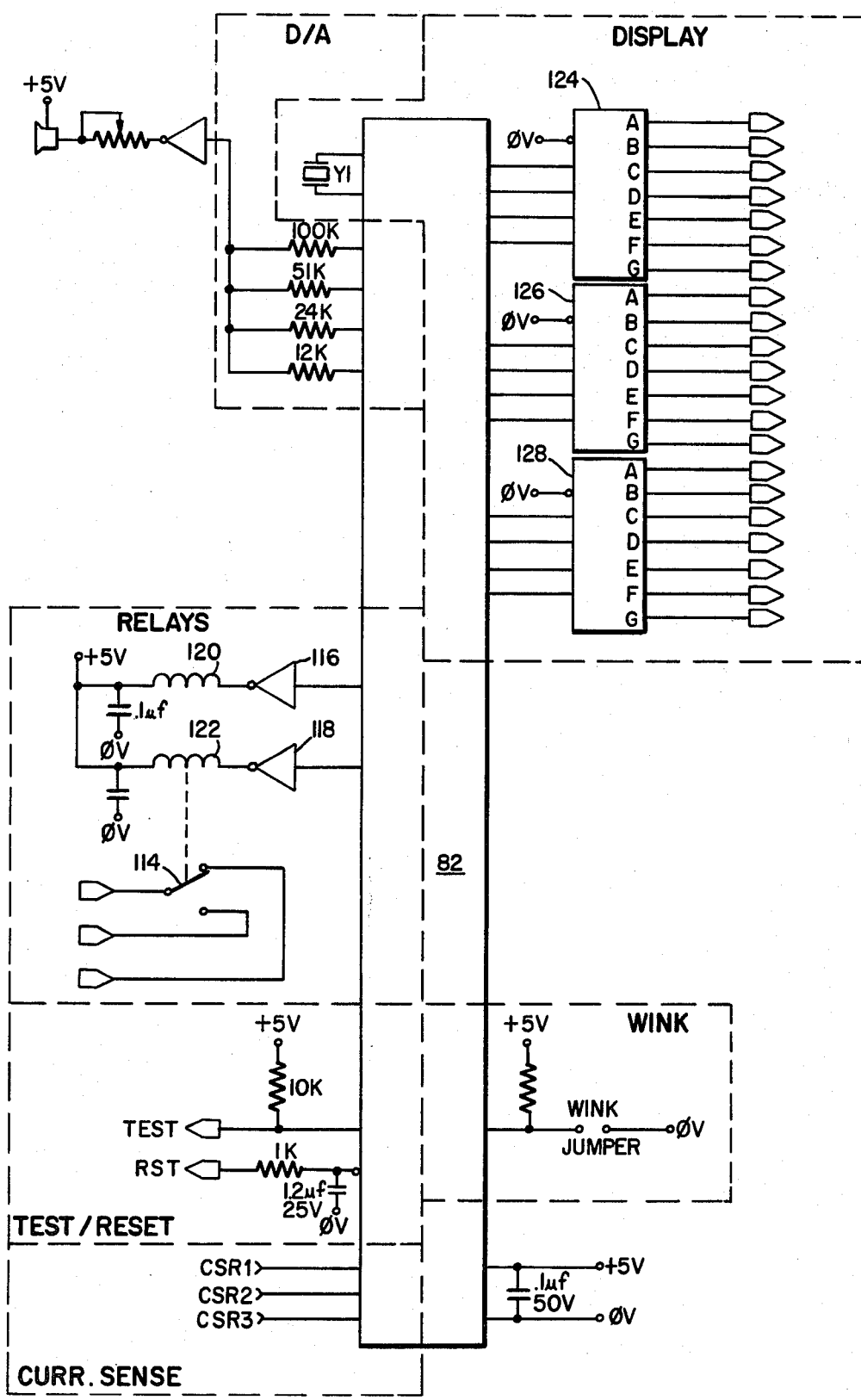
FIG. 4 is a circuit diagram of the control section of the control system of the present invention.

The heart of control section 16 is microprocessor 82 which can be a Zilog Z8 microprocessor. The control section also includes an operator alert circuit which is coupled to ring-back section 14b of the ring-back circuit, relay drivers 86, and several other components, which will be described below. These various circuits are illustrated both in FIG. 2 and in greater detail in FIG. 4. Microprocessor 82 is a complete computer that includes: an arithmatic-logic unit, memory (both RAM and ROM), input-output sections, and internal control sections.

The ring-back circuit and the operator alert circuits include a four bit D-to-A converter formed by resistors 88, 90, 92 and 94, which are driven by microprocessor 82, an operator alert driver 96 and a two-pole active filter that injects ring-back tone signals into a winding on transformer 32. The ring-back wave form pattern can be stored within the microprocessor PROM. The output of the D-to-A converter feeds relay driver 96, which drives a two inch 45 ohm speaker 98. A 100 ohm potentiometer 100 is arranged in series with the speaker for enabling control of the volume of the speaker.

The D-to-A converter also feeds the two-pole active filter having as its active member transistor 102, which is a 2N5225 transistor. The equivalent parallel resistance of the resistors and capacitors coupled to transistor 102 attenuate the frequency components in the synthesized ring-back signal. Resistor 104 stabilizes transistor 102 which faces the reactive load of transformer 32. Resistor 106 serves two purposes: (1) it limits the audio ring-back energy into the DID/Telco access line and (2) together with the diodes in the ring-back circuit it provides isolation of the active electronics from the harsh telephone line environment.

The outputs from the current sensing circuits, CSR1, CSR2 and CSR3 are all coupled to microprocessor 82. An input to the microprocessor from CSR1 indicates clockwise current flow in the DID/Telco interface, an input at CSR2 indicates counterclockwise current flow in the DID/Telco inteface and an input at CSR3 indicates current flow in the operator interface. The outputs from the current sensors are also connected through drivers 108, 110 and 112 (FIGS. 2 and 3) to test lights on the front panel of the control system for providing visual indicators of such conditions.

Relay section 86 provides drive circuits for driving both relay 42, which was described above, and relay 114. Driver 116 is connected to relay coil 120 which is associated with relay 42. Driver 118 is connected to relay coil 122 which is associated with relay 114. Relay 114 is used as an external alarm and can be deliberately energized so that one pair of contacts can sense a power fault. The same contacts can be used to open and close intermittently in syncronization with the ring-back operation whenever an incoming call arrives. A remote call alert bell can be connected to the output of relay 114 so that the alert bell will be activated in synchronization with the ring-back to the caller and will be on continuously during a power fault condition.

To initialize the operation of the microprocessor 82, a reset circuit with pushbutton is provided. In addition, a test input can be provided through the Test Circuit. This test circuit when activated can cause all of the displays to light up and also the operator alert to sound as well as other conditions for test purposes.

Figure 5:
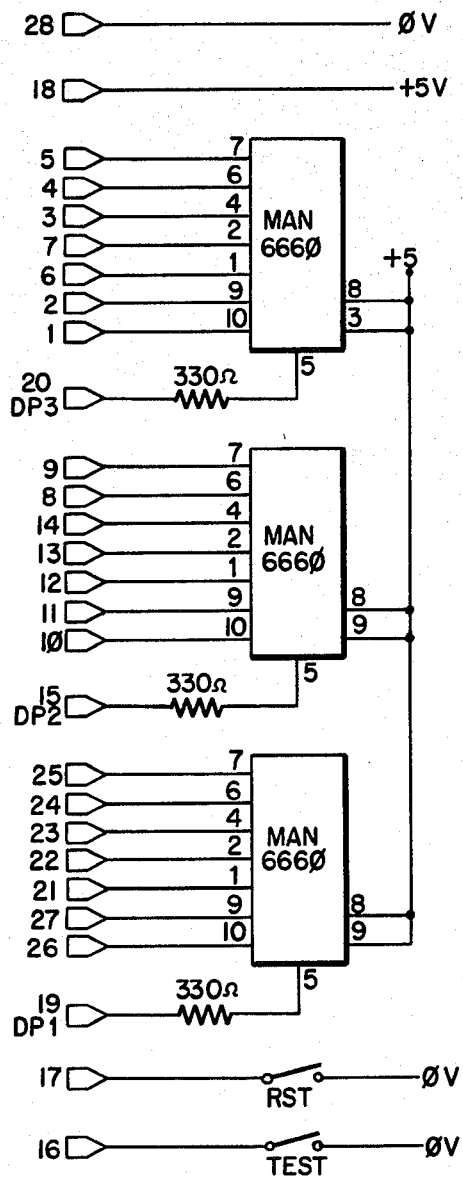
FIG. 5 is a circuit diagram of the front panel display of the control system of the invention.

Three sections of four-bit output signals from microprocessor 82 drive three BCD-to-seven-segment decoders 124, 126 and 128, which drive three LED visual displays (FIG. 5) on the front panel of the control system. Each of the decoders operates one of the visual LED displays. In this manner, the decoded last three numbers of the DID number being called by the incoming call on the access line is displayed by the control system thereby identifying for the operator the number being called. The three decimal points of the visual displays are used as status indicators for the operator and DID interface circuits.

The circuitry of power supply 18 is illustrated in FIG. 2. The incoming line current is rectified by a diode bridge 130 when power is supplied from an AC source. The diode bridge also provides battery reversal protection when it is powered from a DC source. The capacitors 132 and 134 filter the unregulated voltage to the DC-to-DC converter and resistor 136 along with capacitor 138 further smooth out the voltage to the DID lines and the operator lines. The DC-to-DC power switching converter 140 provides a regulated 5 V DC to the various logic components in the system.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A control system capable of being coupled to a single access line from a telephone central office, such single access line being coupled at a telephone central office to a block of telephone number lines, and said control system enabling a telephone answering system to answer and identify incoming direct inward dialed telephone calls received on the single access line, said control system comprising:

a microprocessor controlling means associated with only the single access line coupled to said control system for controlling the operation of said control system;

coupling means for coupling said control system to a single access line that receives direct inward dialed telephone calls from a telephone central office, said coupling means including: an input terminal capable of being coupled to the single access line from the telephone central office; a current sensor for bidirectional current sensing of a signal received from the access line at said input terminal and said current sensor having output terminals coupled to said microprocessor controlling means for enabling said microprocessor controlling means to monitor the current of a signal received at said input terminal; transformer coupling means for coupling signals received from the access line to said operator answering means; and relay means for interconnecting said transformer coupling means and said current sensor;

an operator answering means for enabling an operator at the site of the telephone answering system to be coupled to incoming calls on the access line;

decoding means for decoding at least the last digit of a telephone number being called by an incoming call; and, identification means for identifying a particular telephone number line being called by an incoming call on the access line.

2. A control system according to claim 1 further comprising means for generating a ringback tone signal for transmission to the telephone central office.

3. A control system according to claim 2 further comprising transformer coupling means coupling said operator answering means and said coupling means and wherein said means for generating a ringback tone signal includes a four-bit digital to analog converter and a two pole active filter for injecting a ringback tone signal into said transformer coupling means; and a high resistance speaker coupled to an output of the digital to analog converter for providing an audible ring signal.

4. A control system according to claim 1 wherein said identification means includes at least two visual display members and drive means for activating and controlling said display members.

5. A control system according to claim 1 wherein said operator answering means includes an input operator terminal for enabling a telephone connecting line from an operator switchboard to be coupled to said control system for expanding the telephone answering capacity of such switchboard.

6. A control system according to claim 1 wherein said operator answering means includes: means coupled to said transformer coupling means of said coupling means for receiving signals transmitted through said transformer coupling means; current sensing means for sensing input current received from said transformer coupling means; and an output terminal capable of being coupled to an input jack from an operator control switchboard.

7. A control system according to claim 6 further comprising means for generating a ringback tone signal for transmission to the telephone central office.

8. A control system according to claim 7 wherein said means for generating a ringback tone signal includes a four-bit digital to analog converter and a two pole active filter for injecting a ringback tone signal into said transformer coupling means; and a high resistance speaker coupled to an output of the digital to analog converter for providing an audible ring signal.

9. A control system according to claim 1 wherein said identification means includes three numerical digital displays capable of being driven by said microprocessor controlling means for displaying the last three digits of the identification of the telepone number of an incoming call on the access line.

10. A call forwarding system adapted for utilization in conjunction with an operator station of a telephone switchboard for expanding the capacity of such switchboard, said system being capable of being coupled to a single access line from a central office, such single access line being coupled at a telephone central office to a block of telephone number lines, and said system enabling an operator at the operator station to answer and identify incoming direct inward dialed telephone calls received on the single access line, said system comprising:

a microprocessor controlling means associated with only the single access line coupled to said system for controlling the operation of said system;

coupling means for coupling said system to a single access line that receives direct inward dialed telephone calls from a telephone central office, said coupling means including: an input terminal capable of being coupled to the single access line from the telephone central office; a current sensor for bidirectional current sensing of the signal received from the access line at said input terminal and said current sensor having output terminals coupled to said microprocessor controlling means for enabling said microprocessor controlling means to monitor the current of a signal received at said input terminal; transformer coupling means for coupling signals received from the access line to said operator answering means; and relay means for interconnecting said transformer coupling means and said current sensor;

an operator answering means for enabling an operator at the site of a telephone answering system to be coupled to incoming calls on the access line, said operator answering means including an input operator terminal for enabling a telephone connecting line from the operator station of the telephone switchboard to be coupled to said system for enabling the operator to answer incoming calls so as to expand the telephone answering capacity of the switchboard;

decoding means for decoding at least the last digit of a telephone number being called by an incoming call; and, identification means for identifying a particular telephone number line being called by an incoming call on the access line.

11. A system according to claim 10 further comprising means for generating a ringback tone signal for transmission to the telephone central office.

12. A system according to claim 11 further comprising transformer coupling means coupling said operator answering means and said coupling means and wherein said means for generating a ringback tone signal includes: a four-bit digital to analog converter and a two pole active filter for injecting a ringback tone signal into said transformer coupling means and a high resistance speaker coupled to an output of the digital to analog converter for providing an audible ring signal.

13. A system according to claim 10 wherein said identification means includes at least two visual display members and drive means for activating and controlling said display members.

14. A system according to claim 10 wherein said operator answering means includes: means coupled to said transformer coupling means of said coupling means for receiving signals transmitted through said transformer coupling means; current sensing means for sensing input current received from said transformer coupling means; and an output terminal capable of being coupled to an input jack from an operator control switchboard.

15. A system according to claim 14 further comprising means for generating a ringback tone signal for transmission to the telephone central office.

16. A system according to claim 15 wherein said means for generating a ringback tone signal includes a four-bit digital to analog converter and a two pole active filter for injecting a ringback tone signal into said transformer coupling means; and a high resistance speaker coupled to an output of the digital to analog converter for providing an audible ring signal.

17. A system according to claim 10 wherein said identification means includes three numerical digital displays capable of being driven by said microprocessor controlling means for displaying the last three digits of the identification of the telephone number of an incoming call on the access line.

* * * * *